Figure 2:
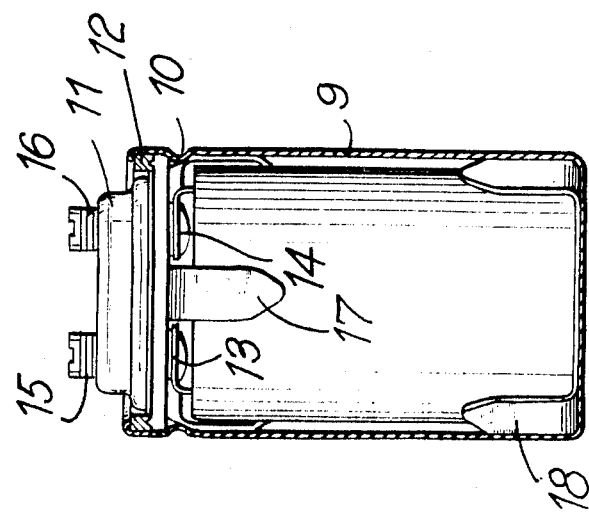

United States Patent
Chesnot

[15] 3,638,077
[45] Jan. 25, 1972

[54] ELECTROLYTIC CAPACITORS

[72] Inventor: Bernard Francois Gustave Chesnot, Paris, France

[73] Assignee: Les Condensateurs Sic-Safco, Colombes, France

[22] Filed: Apr. 2, 1970

[21] Appl. No.: 24,994

Related U.S. Application Data

[63] Continuation-in-part of Ser. No. 701,075, Jan. 29, 1968, Pat. No. 3,546,119.

[52] U.S. Cl............................................................317/230
[51] Int. Cl. ........................................................H01g 9/02
[58] Field of Search................................252/62.2; 317/230

[56] References Cited

UNITED STATES PATENTS 3,546,119  12/1970  Chesnot..............................252/62.2

Primary Examiner—Tobias E. Levow
Assistant Examiner—J. Cooper
Attorney—Waters, Roditi, Schwartz & Nissen

[57] ABSTRACT

The present invention relates to electrolytic capacitors containing an electrolyte which is substantially nonaqueous, in which said electrolyte contains a dissolved chemical compound capable, as a result of the high-operating temperatures of the capacitor, of decomposing while at the same time giving off water and leaving a residue which remains dissolved, both the proportion and the solvent of this compound being so chosen that the dehydration of the latter substantially compensates for the water loss in the capacitor without affecting the electrochemical functioning of the electrolyte at these temperatures.

4 Claims, 2 Drawing Figures 3,638,077

ELECTROLYTIC CAPACITORS

This patent application is a continuation-in-part of my copending U.S. Pat. application Ser. No. 701,075 filed Jan. 39, 1968, now U.S. Pat. No. 3,546,119.

The invention relates to capacitors comprising an electrolyte which is substantially nonaqueous, and its object is to provide capacitors capable of operating for months at high temperatures of the order of 125° C. while nevertheless retaining completely stable properties, the said capacitors being additionally capable of withstanding very low temperatures of the order of −55° C.

In order that an electrolytic capacitor containing a substantially nonaqueous electrolyte should be able to operate at 125° C., the electrolyte obviously cannot contain a large quantity of water, although water must nevertheless be present in a small quantity to reform the anode layer, as is demonstrated by the following experiment which led to the discovery from which the present invention originates:

If a test specimen consisting of a smooth sheet of aluminum is anodized in a bath composed of melted triisopropanolamine borate maintained at 200° C., it will be observed that alumina anode films can be formed up to voltages of around 600 v. However, after a certain number of test specimens have been produced it is found that such formation is no longer possible and that the aluminum test specimen becomes covered with brownish streaks, while the electric current remains at a high and constant value.

Physical and chemical examinations then show that none of the properties of the triisopropanolamine borate, such as its melting point or color, have altered, and that it has not decomposed. It is then observed that the normal formation process can be resumed by adding to the molten bath a small quantity of boric acid which dehydrates into metaboric acid at that temperature, but that if metaboric acid is added directly instead of boric acid, the formation process continues to be impossible. This proves that it is indeed the small quantity of water liberated by the dehydration of the boric acid that permits anode formation.

During protracted operation of the capacitor at 125° C., this vital little quantity of water tends to disappear by evaporation and electrolysis. It is then extremely important for the electrolyte formulation to be such as to ensure that the initial water balance of the essential constituents of the capacitor is retained as far as possible at such temperatures. Otherwise the result will be either premature destruction of the capacitor through self-sustained elevation of the leakage current, or an unacceptable drift in the electrical characteristics of the capacitor.

In accordance with the present invention, the water content of the electrolyte is maintained approximately constant by incorporating in the electrolyte a chemical compound which, at temperatures on the order of 125° C., decomposes and in so doing gives off water and leaves a residue which remains dissolved without affecting the electrochemical functioning of the electrolyte, both the proportion and the solvent of the said compound being so chosen that the dehydration of the latter substantially compensates for the water losses in the capacitor.

A chemical compound particularly suitable for this purpose is boric acid, which dehydrates into metaboric acid in accordance with the reaction:

$$BO_3H_3 \rightarrow BO_2H + H_2O$$

By way of example, γ-butyrolactone, γ-valerolactone and N-methylpyrrolidone can constitute boric acid solvents capable of achieving the aqueous balance in accordance with this invention.

Figure 1:
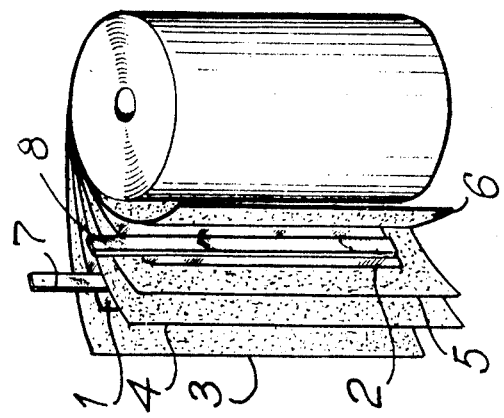

The annexed drawing shows schematically in FIG. 1, an example of a coil of electrodes and insulating sheets between said electrodes in an electrolytic capacitor, said coil being partially open in FIG. 2 a section diametrically made in a finished capacitor.

In the represented embodiments, electrodes 1 and 2 are of conventional construction, smooth or etched aluminum sheets; one of the two electrodes forming an anode is an aluminum sheet, covered by anodic oxidation of a skin of oxide taking the role of a dielectric in said capacitor; porous separators 3, 4, 5 and 6 maintain electrodes in separated situation and are used as reservoir for electrolyte, connecting lugs 7 and 8 being used for electrically connecting said electrodes to terminals, the anodic lug being compulsorily made of a valve metal (aluminum, for example).

On FIG. 2 is shown a conventional section of a capacitor including a coil as shown in FIG. 1. An aluminum box 9, obtained by extrusion, and resistant is used as a container for said with an electrolyte-impregnated coil, said box being provided with a groove 10 forming an abutment for an obturator 11 fastened thereon, leaktightness being obtained by a joint 12, generally in an annulus 12 of elastomeric substance.

Connection lugs 7 and 8 are mechanically connected thereon by soldering or riveting in 13 and 14 to the terminals 15 and 16; coil is maintained in its situation by stars 17 and 18, made of polypropylene, for example, constituted with three fingers. A most particularly preferred electrolytic system for electrolytic capacitor is hereinbelow indicated by the following examples. According to the invention there are obtainable such electrolytic capacitors of the aluminum type comprising a substantially nonaqueous electrolyte which enables anodic formation up to 200° C., by the effect of the thermal dehydration of the boric acid into metaboric acid as the sole source of water, at a rate such that the compensation for the loss of water is effective at all temperatures, without the occurrence of secondary reactions causing a drift of the electrical characteristics of the capacitor, such electrolyte consisting essentially of boric acid dissolved in a solvent selected from the group consisting of γ-butyrolactone, γ-valerolactone and N-methylpyrrolidone, said boric acid being present in an amount of 0.5 to 10 moles per 1 l moles of solvent.

EXAMPLE 1

An electrolyte capable of being utilized up to a maximum of 400 volts can be produced on the basis of the following formulation in which the components are given in terms of moles

| Butyrolactone | 1 l |
| Ethylene glycol | 0.80 |
| Boric acid | 2 |
| Tributylamine | 0.36 | the proportion of boric acid lying between 0.5 and 10 molecules but preferably between 1 and 4 moles and the proportion of tributylamine lying between 0.1 and 2 moles, but preferably between 0.2 and 1 molecule.

Ethylene glycol or another makeup solvent is often necessary in small quantities for reasons of solubility.

In order to lower its resistivity, the composition may have added to it other anion-generating agents chosen from among acetic, acrylic, butyric, citric, isovaleric, lactic, maleic, phosphorous, phosphoric, propionic, tartaric and n-valeric acids. The unexpected observation is then made that the stability of the characteristics is further improved at 125° C., presumably because these other anion-generating agents do not engage in a reaction which is liable to modify them, whereas the boric acid very slowly transforms itself into metaboric acid at this temperature.

This being so, the previously mentioned limits for the formulation will be modified as follows for 1 l moles of butyrolactone: from 0.1 to 10 moles (but preferably from 0.2 to 4 moles) of boric acid, from 0 to 4 moles for the secondary anion-generating agent or agents and from 0.1 to 4 mole for the cation-generating agent or agents.

The nature of the cation-generating agents is not of primary importance provided that it or they remain stable at 125° C. and produce, with the anion-generating agents utilized, compounds which are soluble in the solvents used; tributylamine and triethylamine, for example, meet these requirements.

The formulation given in example 1 above can undergo very many modifications, examples 2 and 3 hereinbelow being given merely to illustrate this.

EXAMPLE 2

| | |
|---|---|
| Butyrolactone | 11 moles |
| Ethylene glycol | 0.80 |
| Boric acid | 1.9 |
| Acetic acid | 0.1 |
| Tributylamine | 0.36 |

The addition of acetic acid improves the properties of the electrolyte insofar as the danger of crystallization at −55° C. is concerned. The longevity at 125° C. is at least equal to that of the electrolyte in example 1.

EXAMPLE 3

| | |
|---|---|
| Butyrolactone | 11 moles |
| Ethylene glycol | 0.80 |
| Boric acid | 1.0 |
| Lactid acid | 1.8 |
| Phosphoric acid | 0.02 |
| Triethylamine | 0.80 |

The incorporation of lactic acid and phosphoric acid distinctly improves the constancy of the impedance at the different temperatures, though the maximum service voltage is lowered to 50 volts.

It goes without saying that, without departing from the scope of the invention, changes may be made in the exemplary formulations given hereinabove. To clearly illustrate the practical advantages of the present invention, mention will be made of a test in which the windings of electrolytic capacitors of 20 $\mu$f./100 volts were dipped in electrolytes Nos. 1 and 2, placed in cylindrical containers 11 mm. in diameter and 32 mm. long, sealed with a synthetic elastomer and reformed for 10 hours at 85° C. they were then energized with their nominal voltage at 125° C., whereupon a 10 percent negative drift in the capacitance value was noted, while the loss factor (measured at 100 cycles per second at 20° C.) rose from 0.06 to 0.09 in 5,000 hours in the case of electrolyte No. 2, as against 2,000 hours in the case of electrolyte No. 1.

In a second test involving capacitors of smaller size (6.35 mm. in diameter and 18 mm. long) rated at 3 $\mu$f./100 volts and impregnated with electrolyte No. 2, the same drifts in the characteristics as in the first test were noted after 3,500 hours of testing at 125° C.

What I claim is:

1. An electrolytic capacitor comprising a plurality of spaced, aluminum electrodes, and a substantially nonaqueous electrolyte in contact with said electrodes consisting essentially of boric acid dissolved in a solvent selected from the group consisting of $\gamma$-butyrolactone, $\gamma$-valerolactone and N-methylpyrrolidone in an amount of 0.5–10 moles per 11 moles of solvent.

2. An electrolytic capacitor as claimed in claim 1, wherein the electrolyte further contains 0.8 mole of ethylene glycol per 11 moles of solvent as a solubilizing agent.

3. An electrolytic capacitor as claimed in claim 1, wherein the electrolyte further contains an aniogenic substance selected from the group consisting of acetic, butyric, lactic, maleic, phosphoric, propionic and tartaric acids in an amount of up to 4 moles per 11 moles of solvent.

4. An electrolytic capacitor as claimed in claim 1, wherein the electrolyte further contains a cationogenic substance selected from the group consisting of tributyl- and triethylamine in an amount of 0.1–2 moles per 11 moles of solvent.

* * * * *